US008831201B2

(12) United States Patent
Ku et al.

(10) Patent No.: US 8,831,201 B2
(45) Date of Patent: Sep. 9, 2014

(54) METHOD AND APPARATUS FOR MANAGING ENUM RECORDS

(75) Inventors: Bernard Ku, Austin, TX (US); James Forsyth, Royal Oak, MI (US); Douglas Lin, Dallas, TX (US); John Richardson, Cedar Park, TX (US); Armstrong Soo, San Francisco, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 2246 days.

(21) Appl. No.: 11/463,638

(22) Filed: Aug. 10, 2006

(65) Prior Publication Data

US 2008/0037757 A1    Feb. 14, 2008

(51) Int. Cl.
*H04M 7/00* (2006.01)
*H04L 29/12* (2006.01)
*H04L 29/06* (2006.01)

(52) U.S. Cl.
CPC .......... *H04L 29/1216* (2013.01); *H04L 61/157* (2013.01); *H04L 29/12132* (2013.01); *H04L 61/6009* (2013.01); *H04L 61/1552* (2013.01); *H04L 65/1016* (2013.01); *H04L 29/12811* (2013.01)
USPC ...... 379/220.01; 709/208; 709/230; 709/245; 709/247; 709/249

(58) Field of Classification Search
CPC ............ H04L 61/6009; H04L 65/1016; H04L 29/1216; H04L 29/12132; H04L 61/157; H04L 29/12811; H04L 61/1552; H04L 61/2076

USPC .......... 370/352–356; 709/230, 245, 247, 249; 379/220.01
See application file for complete search history.

(56) References Cited

U.S. PATENT DOCUMENTS

| | | | |
|---|---|---|---|
| 7,680,876 B1 * | 3/2010 | Cioli et al. ................... 709/201 |
| 2003/0074461 A1 * | 4/2003 | Kang et al. ................... 709/230 |
| 2005/0182781 A1 | 8/2005 | Bouvet | |
| 2005/0249152 A1 * | 11/2005 | Kiss et al. ..................... 370/328 |
| 2006/0023701 A1 * | 2/2006 | Nishida et al. ............... 370/352 |
| 2006/0029043 A1 * | 2/2006 | Nishida et al. ............... 370/352 |
| 2006/0029045 A1 * | 2/2006 | Kobayashi et al. .......... 370/352 |
| 2006/0083222 A1 | 4/2006 | Miyajima et al. | |

* cited by examiner

*Primary Examiner* — Asad Nawaz
*Assistant Examiner* — Najeebuddin Ansari
(74) *Attorney, Agent, or Firm* — Guntin & Gust, PLC; Andrew Gust

(57) ABSTRACT

A method and apparatus for managing ENUM records is disclosed. An apparatus that incorporates teachings of the present disclosure may include, for example, a broker having a detection element that detects a Resource Record (RR) submission made by an IP Multimedia Subsystem (IMS), and a comparison element that retrieves from an object-oriented data storage element a zone associated with the RR, identifies a Domain Name Server (DNS) responsible for processing said zone, compares the zone with a volatile memory of the DNS, and updates the volatile memory according to one or more differences detected. Additional embodiments are disclosed.

15 Claims, 3 Drawing Sheets

METHOD AND APPARATUS FOR MANAGING ENUM RECORDS

FIELD OF THE DISCLOSURE

The present disclosure relates generally to data management in a communication system, and more specifically to a method and apparatus for managing tElephone NUmber Mapping (ENUM) records.

BACKGROUND

As large communication carriers migrate to an IP Multimedia Subsystem (IMS) architecture using ENUM records, a carrier grade ENUM system will be required that can support desired characteristics such as scalability, fast response time, and overall efficient use of hardware and software resources. A large number of Domain Name Servers (DNS) today running, for example, Berkeley's Internet Name Domain (BIND) protocol are not equipped to handle tens of millions of ENUM records for large carriers. Such systems are not readily scalable and have been known to malfunction when processing more than 10 million ENUM records.

A need therefore arises for a method and apparatus that manages ENUM records without the aforementioned deficiencies in the art.

DETAILED DESCRIPTION OF THE DRAWINGS

Embodiments in accordance with the present disclosure provide a method and apparatus for managing ENUM records.

In a first embodiment of the present disclosure, a broker can have a detection element that detects a Resource Record (RR) submission made by an IP Multimedia Subsystem (IMS), and a comparison element that retrieves from an object-oriented data storage element a zone associated with the RR, identifies a Domain Name Server (DNS) responsible for processing said zone, compares the zone with a volatile memory of the DNS, and updates the volatile memory according to one or more differences detected.

In a second embodiment of the present disclosure, a data store can have a storage element that stores in an object-oriented format RRs submitted by an IMS, and submits a collection of RRs to a broker element requesting said collection for updating a volatile memory of a DNS responsible for said collection in response to detecting one or more differences between the collection of RRs and the volatile memory.

In a third embodiment of the present disclosure, a Name Server (NS) can have a processing element that stores in a cache ENUM records associated with a zone, which are updated by a broker element in response to detecting a difference between the ENUM records in the cache and one or more ENUM records stored in a data storage element updated by an IMS.

In a fourth embodiment of the present disclosure, an IMS can operate according to a method having the step of submitting to a data storage element an ENUM record for storage in an object-oriented format and for retrieval by a broker element to update a memory comprising a collection of ENUM records managed by a DNS in response to detecting a difference between the ENUM record submitted by the IMS and the collection of ENUM records in the memory.

Figure 1:
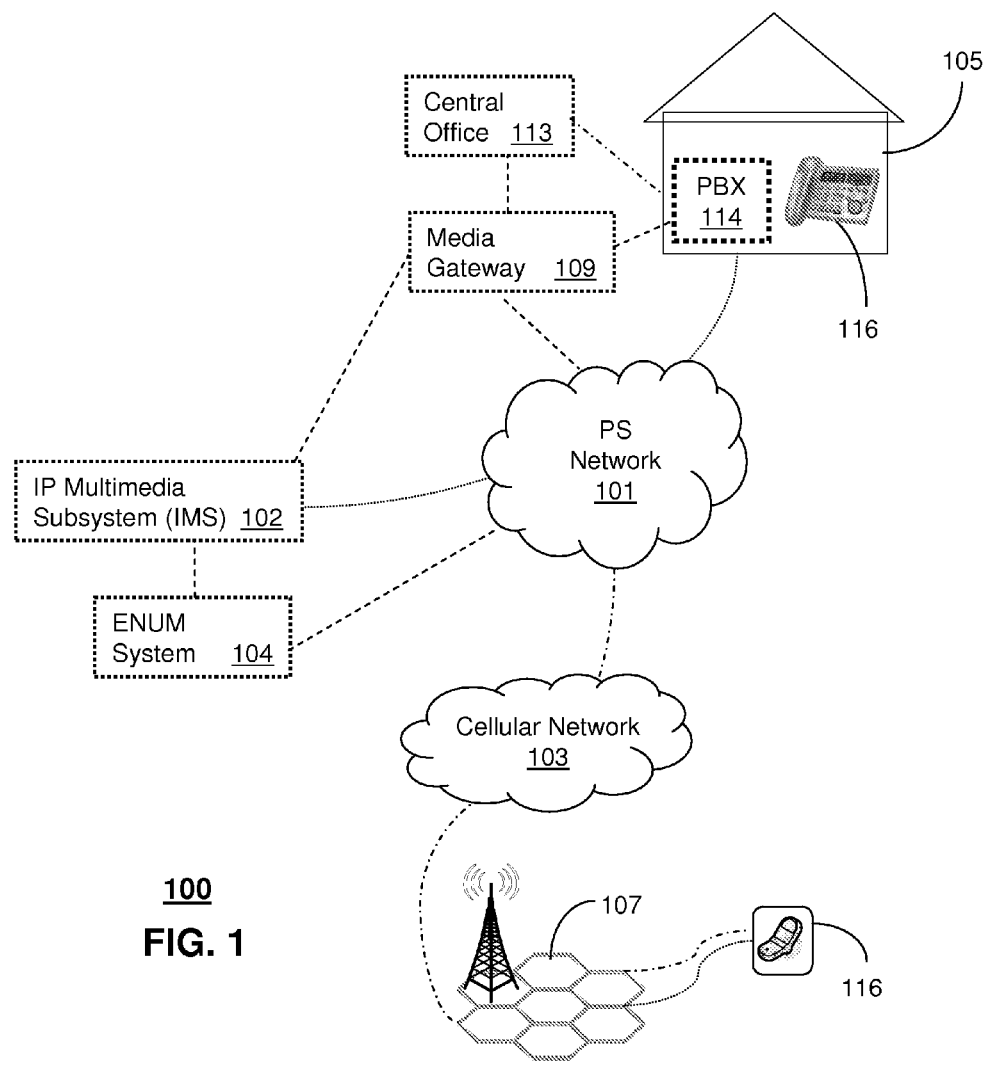
FIG. 1 depicts an exemplary embodiment of a communication system.

FIG. 1 depicts an exemplary embodiment of a communication system 100. The communication system 100 can comprise a Packet Switched (PS) network 101 coupled to an IP Multimedia Subsystem (IMS) 102, an ENUM system 104, a cellular network 103 and network elements located in a building 105 representing an enterprise or residence. The PS network 101 utilizes common technology such as MPLS (Multi-Protocol Label Switching), TCP/IP (Transmission Control Protocol), and/or ATM/FR (Asynchronous Transfer Mode/Frame Relay) for transporting Internet traffic. In an enterprise setting, the building 105 can interface to the PS network 101 by way of a PBX 114 or other common interfaces such xDSL, Cable, or satellite. The PS network 101 can provide voice, data, and/or video connectivity services between terminal devices 116 of enterprise personnel such as a POTS (Plain Old Telephone Service) phone terminal, a Voice over IP (VoIP) phone terminal, or video phone terminal.

In a residential setting, the building 105 can include POTS, VoIP or video phone terminals coupled to an interface to the PS network 101 or a central office 113 utilizing conventional telephonic switches for processing calls with third parties. The IMS 102 can be used to control operations of a media gateway 109, the central office 113 and the PBX 114. Communications between the IMS 102, the terminal devices 116 and other network elements of the communication system 100 can conform to any number of signaling protocols such as signaling system 7 (SS7), session initiation protocol (SIP), or H.323.

The IMS 102 can also be coupled to a telephone number mapping (ENUM) system 104. ENUM is an Internet Engineering Task Force or IETF Standard (RFC 3761). ENUM is a domain name service or DNS-based protocol that is best suited to offer services that expand the means to complete calls over IP networks. It provides a user with a domain name on an E.164 server in order to associate a common international telephone number with a uniform resource identifier or URI and provides other DNS-related services. DNS can be used to look up Internet addresses for services such as SIP VoIP telephony. Naming Authority Pointer or NPTR records are used for translating E.164 addresses to SIP addresses. The ENUM system 104 can also be accessed by the terminals 116 of the communication system 100.

The IMS 102 conforms in part to protocols defined by standards bodies such as 3GPP (Third Generation Partnership Project). Under the control of the IMS 102, the media gateway 109 can link packet-switched and circuit-switched technologies such as the cellular network 103 or central office 113 to the PS network 101, and vice-versa. The media gateway 109 can conform to a proprietary media gateway control protocol (MGCP) or an open standard such as H.248 defined in the Internet Engineering Task Force (IETF). This protocol can handle signaling and session management needed during a multimedia conference. The protocol defines a means of communication between the media gateway 109, which converts data from the format required for a circuit-switched network to that required for a packet-switched network. MGCP can therefore be used to set up, maintain, and terminate calls between disparate circuit-switched and packet-switched network elements of the communication system

100. The media gateway 109 can therefore support hybrid communication environments such as VoIP (or IP video) to POTS and vice-versa.

The cellular network 103 can support voice and data services such as GSM-GPRS, EDGE, CDMA-1X, UMTS, and other known technologies. The cellular network 103 is coupled to base stations 107 under a frequency-reuse environment for communicating over-the-air with roaming terminal devices 116.

Figure 2:
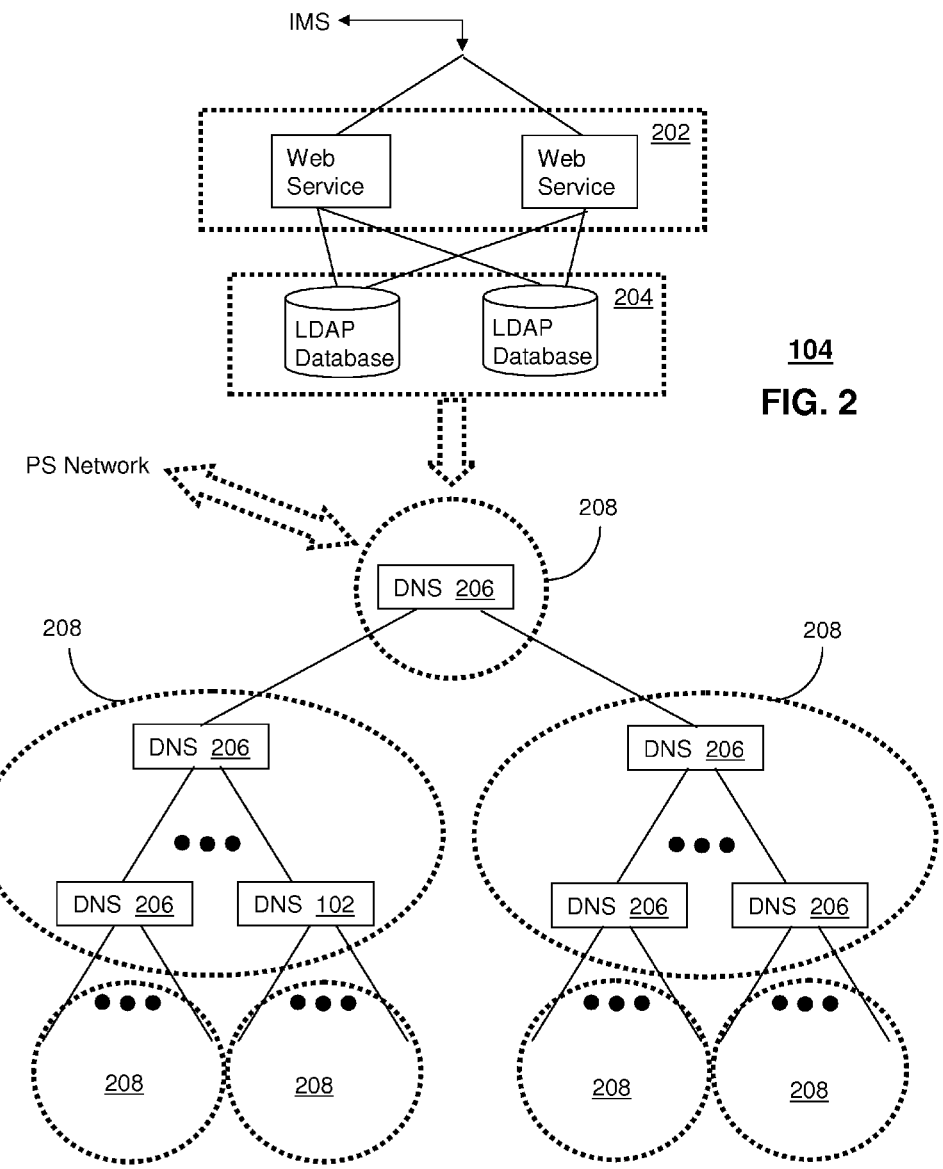
FIG. 2 depicts exemplary embodiment of an ENUM system operating in the communication system.

FIG. 2 depicts exemplary embodiment of the ENUM system 104 operating in the communication system 100. The ENUM system 104 can comprise a broker element 202, a data storage element 204 and a number of Domain Name servers (DNSs) 206. The data storage element 204 can comprise one or more Lightweight Directory Access Protocol (LDAP) databases that store resource records (RRs) in an object-oriented format such as by classes and corresponding zones. With classes and zones RRs can be organized by a country code, a Numbering Plan Area (NPA), and/or a Numeric Numbering Exchange (NXX).

A RR can represent an ENUM record corresponding to an end user of the communication system 100. The ENUM record can be formatted according to any known or future ENUM protocol established by the Internet Engineering Task Force (IETF) or similar body. The data storage element 204 thus serves as a master database of ENUM records such as E.164 addresses held for all subscribers of the communication system 100. ENUM records can also be shared between Tier 1 Internet Service Providers (ISPs) to further enhance the communication reach for their respective subscribers.

The broker element 202 can comprise one or more web services having a detection element and a comparison element. The detection and comparison elements can be implemented with common software and/or hardware technology. The detection element can serve to detect a RR submission from the IMS 102 to the data storage element. Such detection can be accomplished a number of ways. For example, when an ENUM record is recorded, deleted or modified by the IMS 102, the data storage element 204 can set a flag which is detected by the broker element 202. Once detected, the comparison element retrieves from the object-oriented data storage element 204 a zone associated with the ENUM record(s) updated. The comparison element then identifies a Domain Name Server (DNS) 206 responsible for processing or managing said zone, compares the zone with a cache (or volatile memory or RAM) of the DNS, and updates the cache according to one or more differences detected.

DNS servers 206 can be organized by zones and sub-zones 208 as shown in FIG. 2. A zone associated with an ENUM record can be determined by the comparison element according to a common DNS recursive technique. For example, an ENUM record for a VoIP terminal 116 having the phone number 1-222-333-4444 can be coded as 4.4.4.4.3.3.3.2.2.2.1.e164.arpa. This ENUM record can be broken into a number of zones such as by country (country code "1"), NPA ("222"), and/or NXX ("333"). The service provider of the communication system 100 can utilize any object-oriented approach desired to organize ENUM records domestically, nationally and internationally in the LDAP master databases 204 and corresponding DNS servers 206. Based on this object-oriented structure, the broker element 202 can by way of the comparison element find the appropriate DNS server 206 with minimal latency.

Once the comparison element finds a DNS server 206 corresponding to the zone being updated by the IMS 102, the comparison element can utilize a loopback interface which is well known in the art to compare ENUM records in the zone extracted from the data storage element 202 and the ENUM records of the same zone stored in the volatile cache memory of the DNS server 206, and make updates to the cache memory with minimal or no interruption to the ENUM services for said server. Once updated, the DNS server 206 of said zone can supply up-to-date services to DNS clients (e.g., a common browser operating in a computing device or a VoIP terminal 116 coupled to the PS network 101). During periodic maintenance cycles, the DNS server 206 eventually stores the updated cached memory in a non-volatile storage medium such as a hard disk drive.

The aforementioned DNS servers 206 can operate according to a modified version of Berkeley's Internet Domain (BIND) protocol (e.g., a modified version BIND 9.3.2) that supports the aforementioned updates by the broker element 202 in its volatile memory such as cache memory. The broker element 202 can operate as a separate entity as shown in FIG. 2 or as an integral part of the data storage element 204, and/or the DNS servers 206.

The embodiment depicted in FIG. 2 provides a highly scalable approach to deploy ENUM services. The ENUM records can be distributed horizontally or vertically among the DNS servers 206 without exceeding their memory or processing capacity, which in prior art BIND DNS servers has been known to be limited to approximately 10 million records. Similarly, the LDAP master databases provides a central means for storage of all ENUM records which can be retrieved quickly by the DNS servers 206 and the broker element 202 by way of the object-oriented format selected by the service provider of said system.

It would be evident to an artisan with ordinary skill in the art that the aforementioned embodiments can be modified, reduced, or enhanced without departing from the scope and spirit of the claims described below. For example, the DNS servers 206 can operate according to a proprietary application that is not based on BIND without departing from the scope of the claims. The same can be said of the data storage element 204. These are but a few examples of modifications that can be applied to the present disclosure. Accordingly, the reader is directed to the claims below for a fuller understanding of the breadth and scope of the present disclosure.

Figure 3:
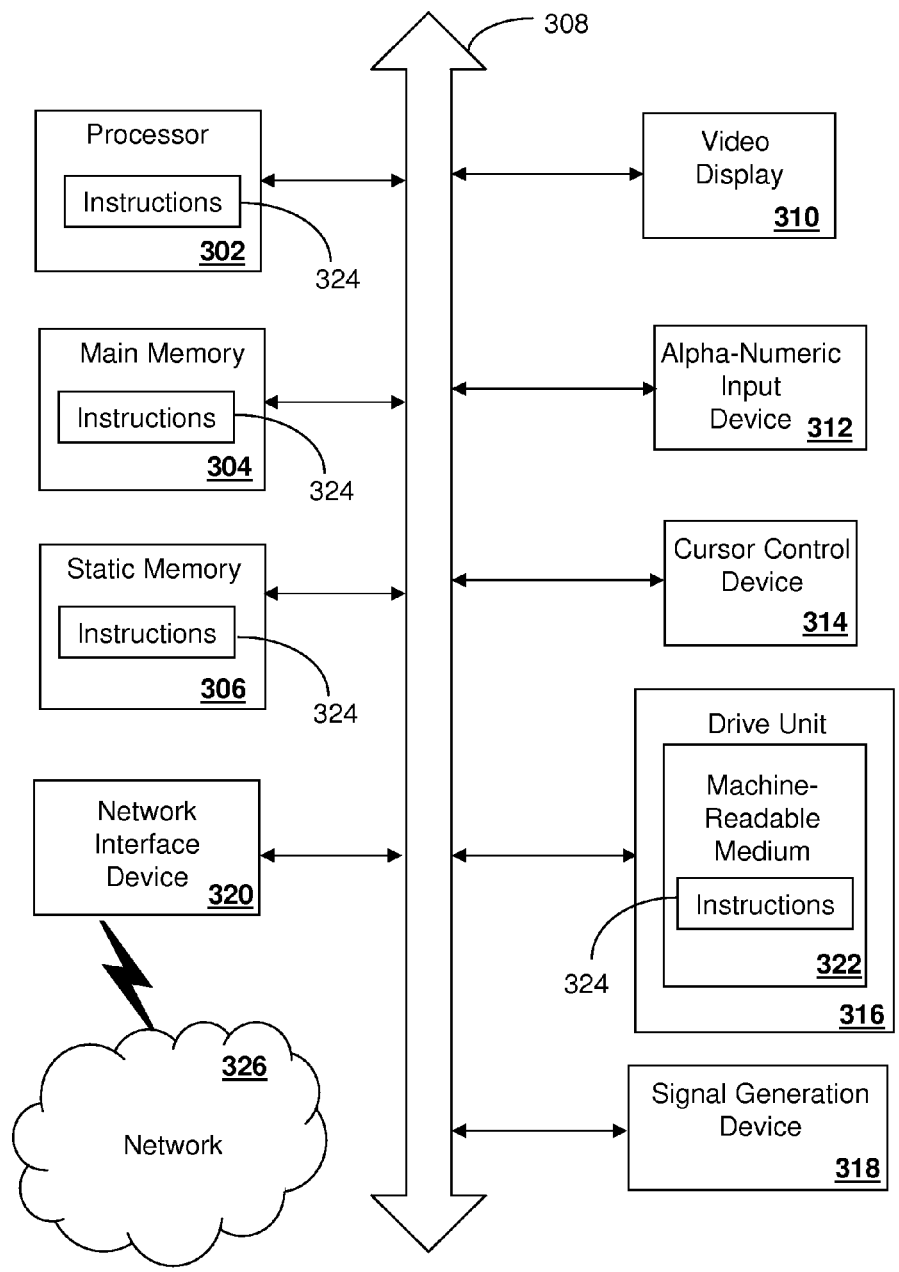
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A broker device, comprising:
  a memory;

a detection processing device that detects a resource record submission made by an IP multimedia subsystem; and a comparison processing device that retrieves from an object-oriented data storage element a zone associated with the resource record submission, identifies a domain name server responsible for processing the zone from among a group of domain name servers, compares the zone with a volatile memory of the domain name server, updates the volatile memory according to a difference detected between the resource record submission and resource information of the zone, and periodically updates a non-volatile memory of the domain name server based on the updates to the volatile memory, wherein the updates to the volatile memory are performed responsive to the resource record submission being detected, wherein aggregate resource information is distributed among the group of domain name servers based on zones organized by at least one among a country code, a numbering plan area or a numeric numbering exchange, and wherein the identified domain name server manages only a portion of the aggregate resource information, wherein operations of the data storage element conforms to a lightweight directory access protocol that stores resource records in an object-oriented format according to classes and corresponding zones, wherein operations of the domain name server conforms to a Berkeley internet domain protocol that supports volatile memory updates performed by the broker device, and wherein the comparison processing device updates the volatile memory using a loopback interface of the domain name server.

2. The broker device of claim 1, wherein the resource records conform to a telephone number mapping format.

3. The broker device of claim 2, wherein the resource records stored by the data storage element are organized according to classes and corresponding zones comprising at least one among a country code, a numbering plan area, and a numeric numbering exchange.

4. The broker device of claim 1, wherein the broker device comprises one among an integral component of the data storage element, an integral component of the domain name server, and a stand alone computing element.

5. The broker device of claim 1, wherein the broker device comprises a web service.

6. A non-transitory computer-readable storage device comprising instructions, which, responsive to being executed by a processor of a broker device that includes a detection processing device and a comparison processing device, cause the processor to perform operations comprising:

detecting a resource record submission made by an IP multimedia subsystem; retrieving from an object-oriented data storage element a zone associated with the resource record submission;

identifying a domain name server responsible for processing the zone from among a group of domain name servers;

comparing the zone with a volatile memory of the domain name server; updating the volatile memory according to a difference detected between the resource record submission and resource information of the zone; and periodically updating a non-volatile memory of the domain name server based on the updates to the volatile memory, wherein the updates to the volatile memory are performed responsive to the resource record submission being detected, wherein aggregate resource information is distributed among the group of domain name servers based on zones organized by at least one among a country code, a numbering plan area or a numeric numbering exchange, wherein the identified domain name server manages only a portion of the aggregate resource information, wherein operations of the data storage element conforms to a lightweight directory access protocol that stores resource records in an object-oriented format according to classes and corresponding zones, wherein operations of the domain name server conforms to a Berkeley internet domain protocol that supports volatile memory updates performed by the broker, and wherein the volatile memory is updated using a loopback interface of the domain name server.

7. The non-transitory computer-readable storage device of claim 6, wherein the resource records conform to a telephone number mapping format.

8. The non-transitory computer-readable storage device of claim 6, wherein the resource records stored by the data storage element are organized according to classes and corresponding zones comprising at least one among a country code, a numbering plan area, and a numeric numbering exchange.

9. The non-transitory computer-readable storage device of claim 6, wherein the broker device comprises one among an integral component of the data storage element, an integral component of the domain name server, and a stand alone computing element.

10. The non-transitory computer-readable storage device of claim 6, wherein the broker device comprises a web service.

11. A method comprising detecting, by a broker device comprising a detection processing device and a comparison processing device, a resource record submission made by an IP multimedia subsystem;

retrieving, by the broker device, from an object-oriented data storage element a zone associated with the resource record submission;

identifying, by the broker device, a domain name server responsible for processing the zone from among a group of domain name servers;

comparing, by the broker device, the zone with a volatile memory of the domain name server;

updating, by the broker device, the volatile memory according to a difference detected between the resource record submission and resource information of the zone; and periodically updating, by the broker device, a non-volatile memory of the domain name server based on the updates to the volatile memory, wherein the updates to the volatile memory are performed responsive to the resource record submission being detected, wherein aggregate resource information is distributed among the group of domain name servers based on zones organized by at least one among a country code, a numbering plan area or a numeric numbering exchange, wherein the identified domain name server manages only a portion of the aggregate resource information, wherein operations of the data storage element conforms to a lightweight directory access protocol that stores resource records in an object-oriented format according to classes and corresponding zones, wherein operations of the domain name server conforms to a Berkeley internet domain protocol that supports volatile memory updates performed by the broker, and wherein the volatile memory is updated using a loopback interface of the domain name server.

12. The method of claim 11, wherein the resource records conform to a telephone number mapping format.

13. The method of claim 11, wherein the resource records stored by the data storage element are organized according to classes and corresponding zones comprising at least one among a country code, a numbering plan area, and a numeric numbering exchange.

14. The method of claim 11, wherein the broker device comprises one among an integral component of the data storage element, an integral component of the domain name server, and a stand alone computing element.

15. The method of claim 11, wherein the broker device comprises a web service.

\* \* \* \* \*